(12) United States Patent
Martin

(10) Patent No.: US 6,538,350 B2
(45) Date of Patent: Mar. 25, 2003

(54) ELECTROMOTOR CONSTRUCTION AND METHOD

(75) Inventor: Gunther Martin, Nuremberg (DE)

(73) Assignee: Buehler Motor GmbH, Nuremberg (DE)

( * ) Notice: Subject to any disclaimer, the term of this patent is extended or adjusted under 35 U.S.C. 154(b) by 7 days.

(21) Appl. No.: 09/901,631

(22) Filed: Jul. 11, 2001

(65) Prior Publication Data

US 2002/0047330 A1 Apr. 25, 2002

(30) Foreign Application Priority Data

Jul. 12, 2000 (DE) .......................... 100 33 862

(51) Int. Cl.[7] .......................... H02K 1/04; H02K 11/00; H02K 5/00
(52) U.S. Cl. .............................. 310/43; 310/71; 310/89
(58) Field of Search .............................. 310/43, 71, 88, 310/89, 67 R

(56) References Cited

U.S. PATENT DOCUMENTS

| 4,451,750 A | * | 5/1984 | Herur et al. ................... 310/88 |
| 4,626,721 A | * | 12/1986 | Ouchi .......................... 310/71 |
| 5,847,477 A | | 12/1998 | Shiroyama et al. |
| 6,020,661 A | * | 2/2000 | Trago et al. ................... 310/43 |
| 6,081,056 A | * | 6/2000 | Takagi et al. .................. 310/89 |

FOREIGN PATENT DOCUMENTS

| DE | 195 18 215 A1 | 11/1995 | .......... H02K/5/128 |
| EP | 0 855 783 A2 | 7/1998 | ............ H02K/5/22 |
| FR | 25 80 439 | 10/1986 | ............ H02K/5/22 |

* cited by examiner

Primary Examiner—Thanh Lam
(74) Attorney, Agent, or Firm—Jacobson Holman PLLC

(57) ABSTRACT

An electromotor, in particular a brushless pump motor having a motor housing, a circuit board, flexible electric lines that are guided in a passage through the motor housing and connected to the circuit board by way of connections, with hollow spaces in the motor housing being partially or completely filled with a hardenable plastic material. The flexible electric lines run between their connections to the circuit board and the passage of the motor housing with a total change in direction amounting to at least 40° and are arranged in at least one of the hollow spaces of the motor housing that is filled with hardenable plastic material, such as polyurethane foam. The flexible electrical lines are essentially completely surrounded by the hardenable plastic material at least in the regions of the changes in direction in the progression of the electric lines. Alternative methods of assembling the motor are provided.

15 Claims, 10 Drawing Sheets

ELECTROMOTOR CONSTRUCTION AND METHOD

BACKGROUND OF THE INVENTION

The present invention relates to improvements in electromotors, especially brushless motors. In known electromotors of the brushless type, the tensile forces conducted through the electrical lines into the motor are absorbed such that they are guided into the motor housing by way of a form fit. It is also known to secure the electric lines by means of the known principle of rope friction. Preferably, a separate component is used for the purpose of implementing the rope friction concept. Typically, the component is embodied in the form of a labyrinth and, after the flexible electrical lines have been inserted, this labyrinth is attached by means of a bracket. The tensile forces are conducted into the motor housing by way of this labyrinth with its affixed bracket, producing high stresses in the motor housing. This requires a very sturdy construction. In addition, a large portion of the construction space of the entire electromotor is taken up thereby, such that correspondingly less construction space is available for the electrical or magnetic part of the electromotor. Thus, there is little usable construction space in the motor relative to the total construction space. This results in lower performance of the electromotor in the context of the given construction space.

In an electromotor of the brushless type, the flexible electric lines are often sprayed with a closed-pore elastomeric material with a low degree of ductility, with this material being conventionally used as an insulation and sealing medium for protecting the electric and electronic components arranged in the electromotor from chemical and mechanical influences, such as vibrations.

The present invention is directed to addressing the prior art problems just discussed.

BRIEF SUMMARY OF THE INVENTION

In a known electromotor of this type, expensive measures are necessary to achieve sufficient relief of line tension; therefore, a primary object of the present invention is to create an electromotor that is simple to mount with few components. This object is attained in accordance with the invention in that securing of the flexible electric lines in a fixed position is guaranteed in all spatial directions solely by a hardenable plastic material, whereby the connections do not need to absorb or transfer any mechanical forces, in particular tensile forces.

It is another object of the present invention to create an electromotor, with its given constructed size, good impermeability, and high mechanical loading capacity, that is not only simple to mount with few components, but ideally allows an optimal use of the electrically and/or magnetically usable construction space with a total construction space that is as large as possible.

These and other objects and advantages are in the present invention, which comprises an electromotor, in particular, a brushless pump motor that is made up of essentially a motor housing, a stator winding, and a circuit board. Flexible electrical lines are guided through the motor housing in a passage and electrically connected to the circuit board by way of connections. Hollow spaces defined in the motor housing are partially or completely filled with a hardenable plastic material. The flexible electrical lines run between their connections to the circuit board and the passage of the motor housing with a total change in direction amounting to at least 40° and are arranged in at least one of the hollow spaces of the motor housing that is filled with hardenable plastic material such as polyurethane foam. In this way, the flexible electrical lines are essentially completely surrounded by the hardenable plastic material at least in the regions of the changes in direction in the progression of the electric lines.

By using the known principle of rope friction, the changes in direction in the progression of the flexible electric lines allow high resistance to slippage of the flexible electric lines. In this connection, the form and/or direction in which these changes in direction occur are immaterial.

In the present invention, fixing of the flexible electric lines is guaranteed in all spatial directions by the hardenable plastic material alone, whereby the connections need not absorb or transfer any mechanical forces, particularly tensile forces. The hardenable plastic material not only serves as a seal, but also serves as a tension relief in all spatial directions. The tension relieving effect is determined solely by the properties of the hardenable plastic material and the geometric arrangement of the flexible electric lines, with additional components being omitted as tension relievers. The greatest possible use of the electrically and/or magnetically useable construction space relative to the total construction space is achieved by means of a motor housing with walls as thin as possible. This can be realized if the tensile forces acting on the flexible electrical lines are transferred over a large area by way of the hardenable plastic mass into the motor housing.

An excellent impermeability is achieved with the electromotor in accordance with the invention in that the hardenable plastic reaches a foam-like, preferably closed-pore, state as a result of an expansion process. In this manner, the hardened plastic nuzzles itself against the motor, limited by the motor wall, and surrounds static components located in the interior of the motor.

In the present exemplary embodiment, the motor housing comprises a housing cover and a one-piece or assembled housing pot. The housing cover serves to facilitate the mounting of the flexible electric lines in a defined bent progression in that one-piece guides are provided on the housing cover. The bent progression is a precondition for secure tension relief in all-spatial directions. In a preferred embodiment, the guides are in the form of protruding risers or pins. Because the guides do not have to perform a tension relief function, they do not completely surround the flexible electric lines. Thus, they can additionally be structured in a material- and space-saving manner.

In their mounted state, the guides reach approximately up to the circuit board and they are formed in such a way that, in their mounted state, they enter into a frictional and/or form-fitting connection with the hardenable plastic material in the axial direction. By means of this measure, a secure fixture of the housing cover on the housing pot is achieved. This arrangement thus eliminates the need for an expensive additional connection between the housing cover and the housing pot.

It is self-evident to provide motor housings with at least one opening to facilitate the introduction of the hardenable plastic material inside the motor housing. For the purpose of pressure relief during filling, it is useful to provide two openings in the housing cover.

A particularly helpful measure to facilitate introduction of the hardenable plastic material is the arrangement of a bushing between the flexible electrical lines and their passage in the motor housing. The bushing tightly surrounds the flexible electric lines and the motor housing in such a way that the hardenable plastic mass cannot escape out of the housing in its fluid state. In like manner, the housing cover seals off the housing pot with a mounted bush.

In order to achieve a particularly secure relief of tension, the flexible electric lines in the motor housing preferably run in a loop, i.e., with the greatest possible total change in direction in the smallest space.

A further improved tension relief results if the hardenable plastic material approximately completely fills the space between the housing cover and the circuit board because the hardenable plastic material can then connect on a large surface with the formations of the housing and the circuit board with a form-fitting and/or frictional and/or material connection.

So that the connection between the housing pot and the hardenable plastic material is also sufficient, it is recommended that the housing pot be formed in such a way that a form-fitting and/or frictional and/or material connection is present between the housing pot and the hardenable plastic material.

In order to be able to economically mount the electromotor in accordance with the invention, two mounting sequences are recommended.

In accordance with the first recommended sequence, a first construction unit comprising a wound stator core and the circuit board provided with the electric lines is first inserted into the motor pot. Then the flexible electric lines are inserted into the guides of the housing cover. With the positioning of the motor cover relative to the motor housing being established by means of the bush, the motor cover is inserted into the motor housing. Then, the motor housing is filled with the hardenable plastic material through at least one opening in the motor housing, and finally the plastic material is allowed to harden.

In accordance with the second recommended sequence, the wound stator core is mounted in an assembled condition in the second construction unit with the circuit board and the connection lines, and then the flexible electric lines are inserted into the guides of the housing cover. The arrangement of the third construction unit of the circuit board and the flexible electric lines, and the housing cover to the motor housing is produced and oriented to fit in the motor pot 11. The motor housing is filled with the hardenable plastic material through at least one opening in the motor housing, and finally the hardenable plastic material is allowed to harden.

Exemplary embodiments of the invention will be explained in greater detail in the following with reference to the drawings.

DETAILED DESCRIPTION OF THE INVENTION

Figure 1:
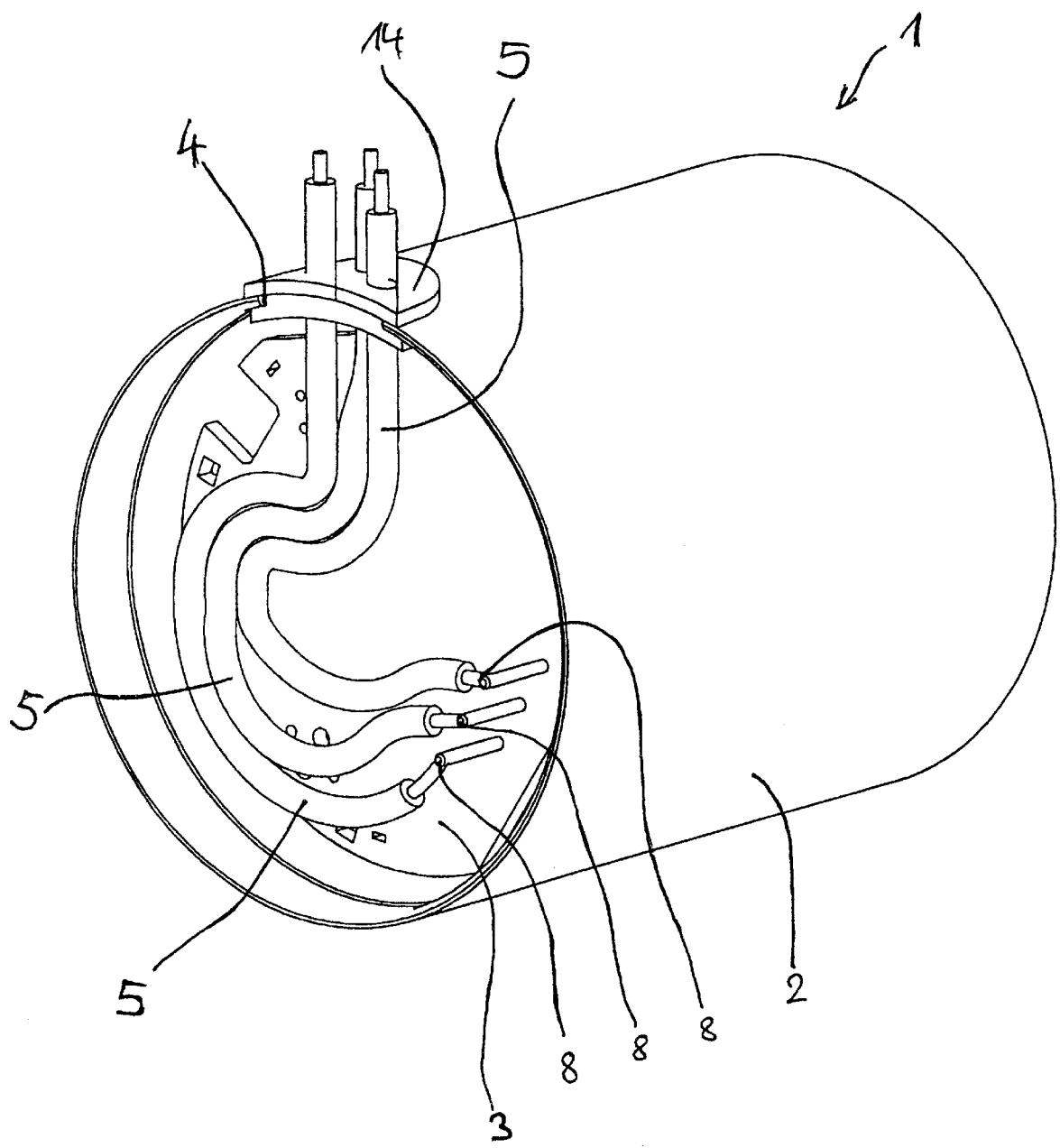
FIG. 1 is a perspective view of an electromotor in accordance with the invention in a partially mounted state.

FIG. 1 shows a spatial depiction of the electromotor 1 in accordance with the invention, with a motor housing 2, flexible electric lines 5, and a circuit board 3 that is electrically connected to the flexible electric lines 5 by way of connections 8. A bushing 14 tightly encloses the flexible electric lines 5 and is arranged in an opening 4 of the motor housing 2.

Figure 2:
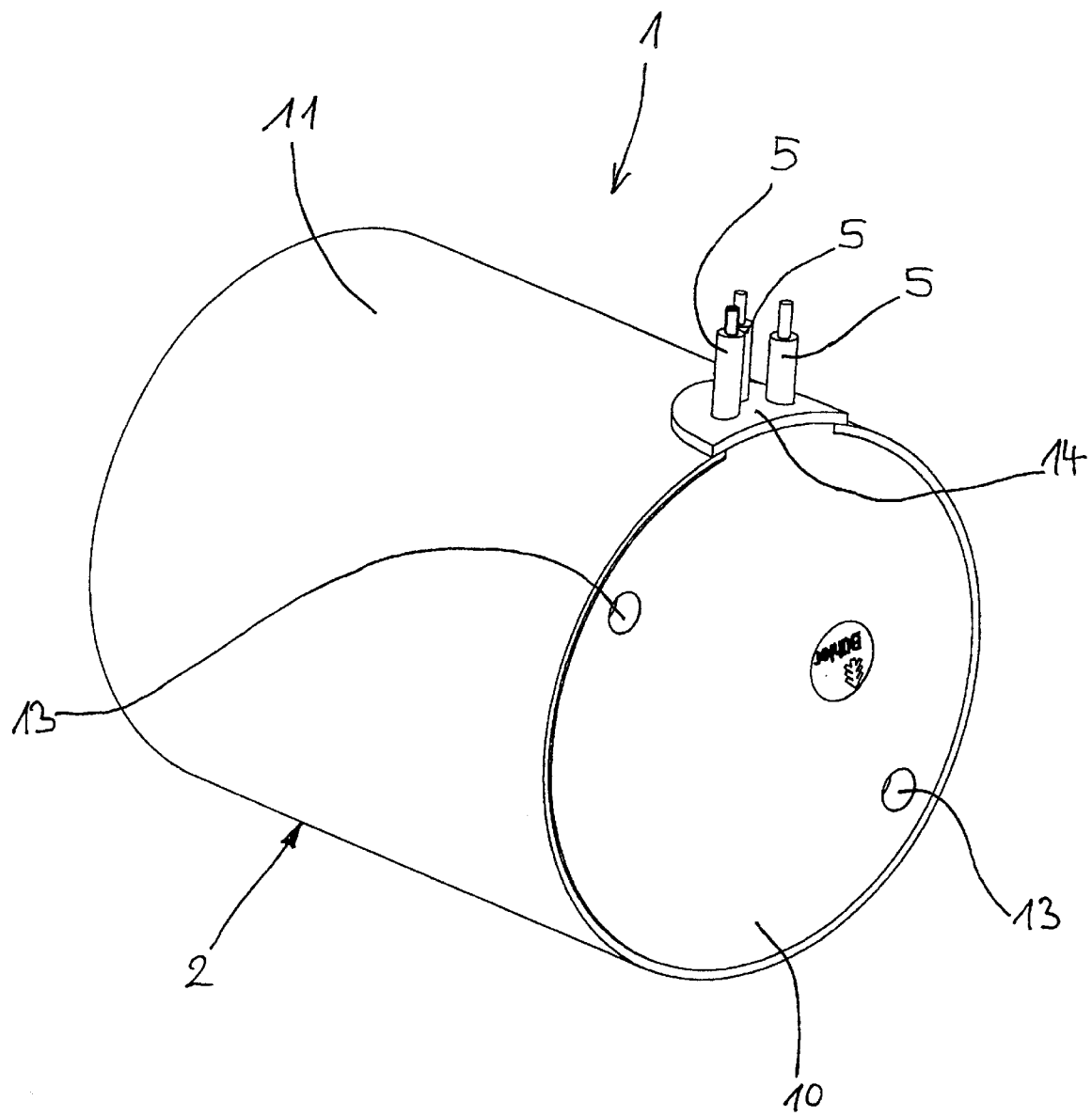
FIG. 2 is a spatial depiction of the completely mounted electromotor in accordance with the invention.

FIG. 2 is the depiction of the electromotor 1 in accordance with the invention in its assembled state, with the motor housing 2 comprising a housing pot 11 and a housing cover 10. The bushing 14 which can, for example, be made of rubber surrounds the flexible electric lines 5, which are shown here in a shortened manner for the sake of simplicity. The opening 13 in the housing cover is provided to allow the introduction of hardenable plastic material into the motor housing.

Figure 3:
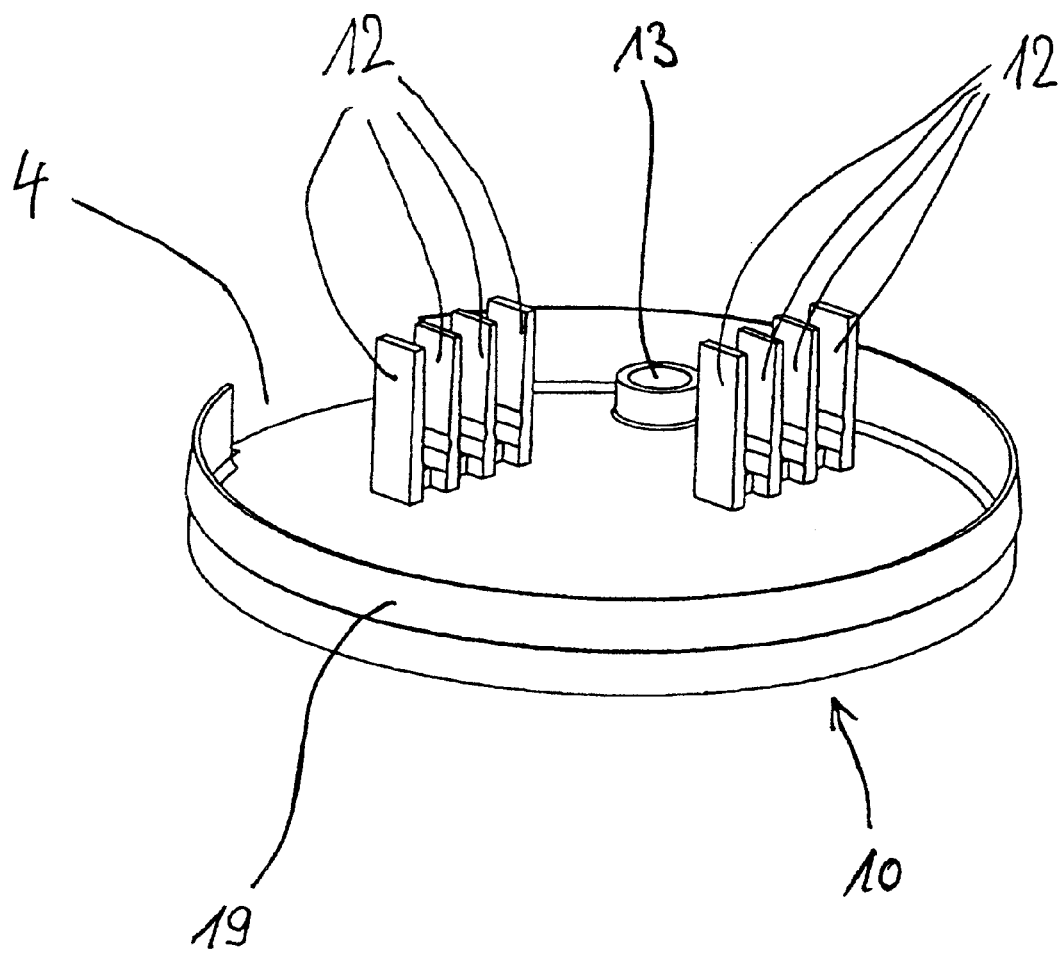
FIG. 3 is a perspective view of a housing cover for use with the electromotor of FIG. 1.

FIG. 3 shows the interior of the housing cover 10 with a partially circulating wall 19 defined about the periphery of the cover. Guides 12 are provided as a way to accept and position the flexible electric lines. The opening 13 allows the hardenable plastic material to enter the interior space within the electromotor. The opening 4 allows passage of the flexible electric lines. The bushing 14 will fill the opening 4 and surround the electric lines 5. Finally, the guides 12 are formed as an integral part of the housing cover 10 and dimensioned in such a way that they are elastic and can accept the flexible electric lines.

Figure 4:
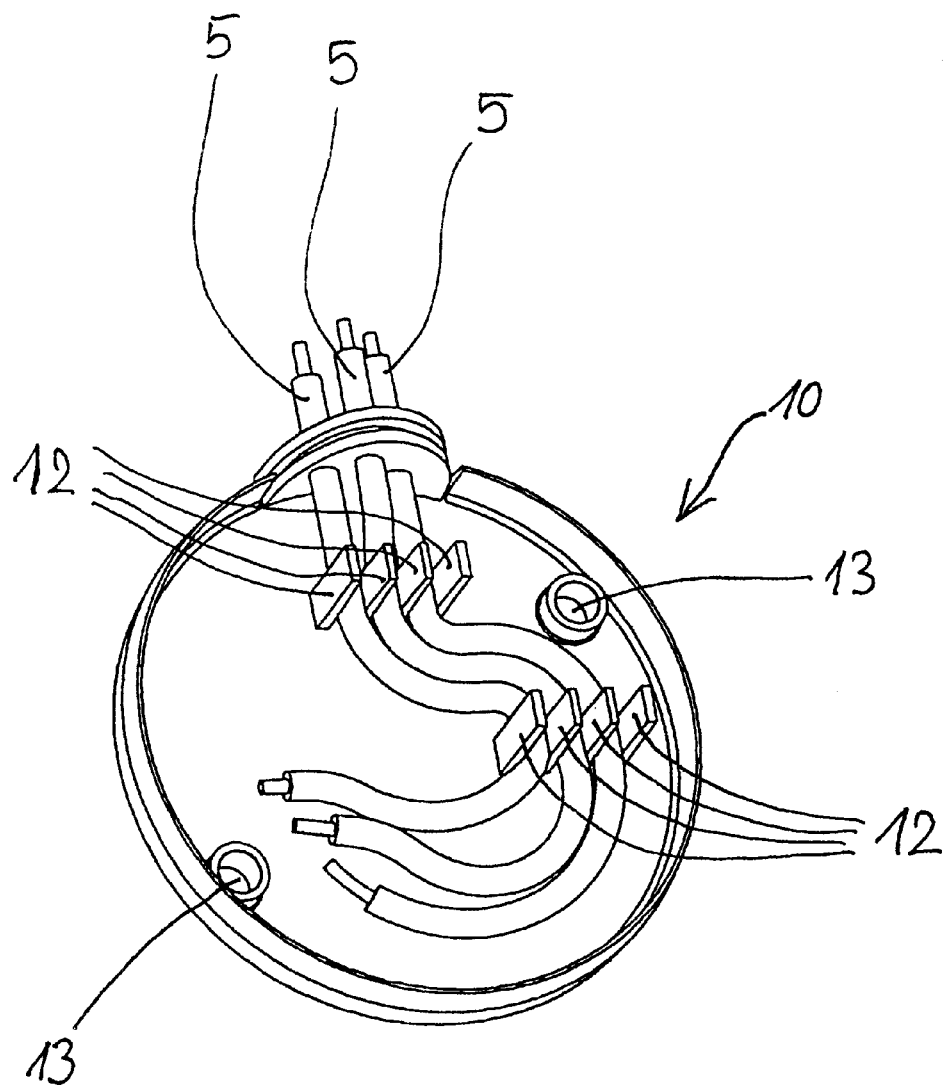
FIG. 4 is a perspective view of the housing cover of FIG. 3 with inserted flexible electric lines.

In FIG. 4, the interior of the housing cover 10 is shown with the pre-mounted flexible electric lines 5. The flexible electric lines are positioned in the guides 12 in such a way that the total of all of the bend changes in direction total at least 40°. The guides are dimensioned in such a way that they could not be used alone to achieve a sufficient tension-relieving effect.

Figure 5:
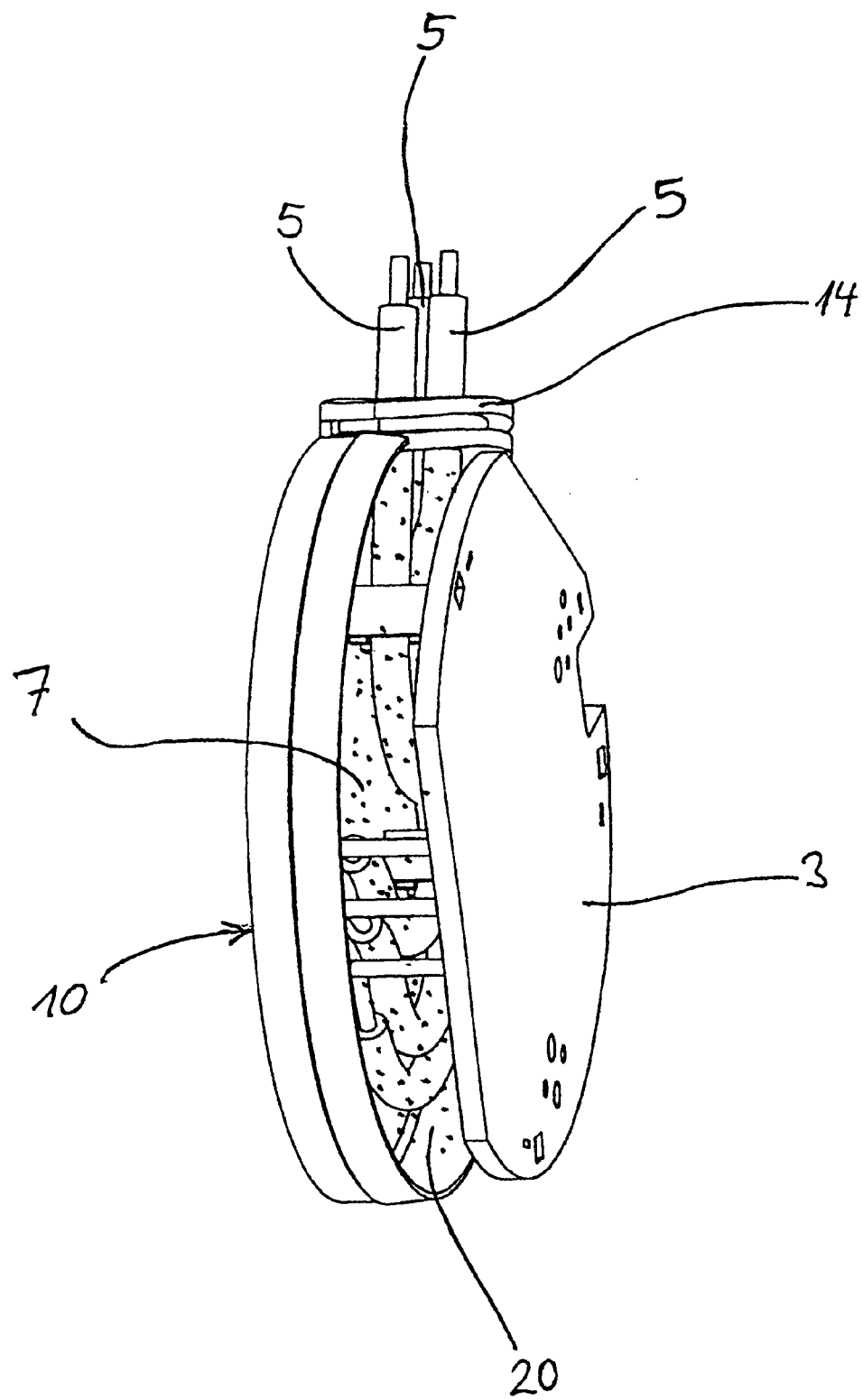
FIG. 5 is a perspective of the housing cover with a pre-mounted circuit board.

FIG. 5 shows a simplified view of the electromotor 1, with the top of the motor. Some of the components of the electromotor located therein are omitted, so that the arrangement among the housing cover 10, the circuit board 3, the flexible electric lines 5, and the bushing 14 can be seen. A space 20 is defined between the interior of the housing cover 10 and the circuit board 3. This space is filled with the hardenable plastic material 7, such as polyurethane foam, in a simplified and transparent manner (dotted lines), whereby an inner connection of the above-mentioned components to the hardenable plastic material results.

Figure 6A:
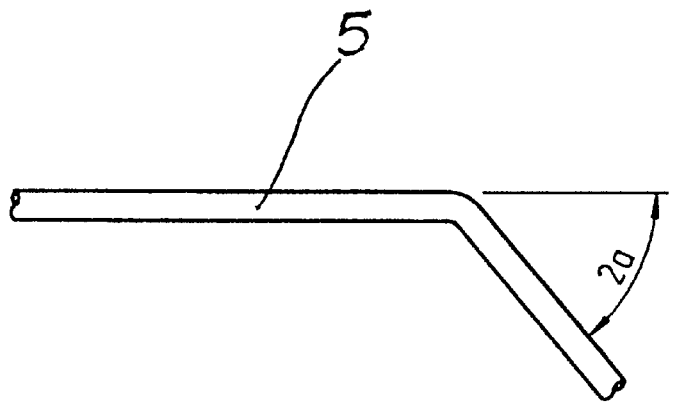
FIGS. 6a, 6b, and 6c are plan schematic views of a flexible electric line with various changes of direction.
Figure 6B:
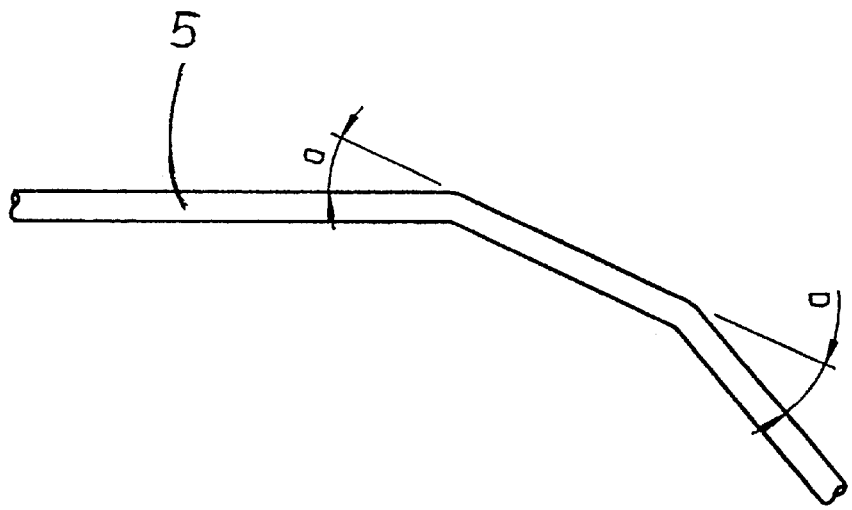
Figure 6C:
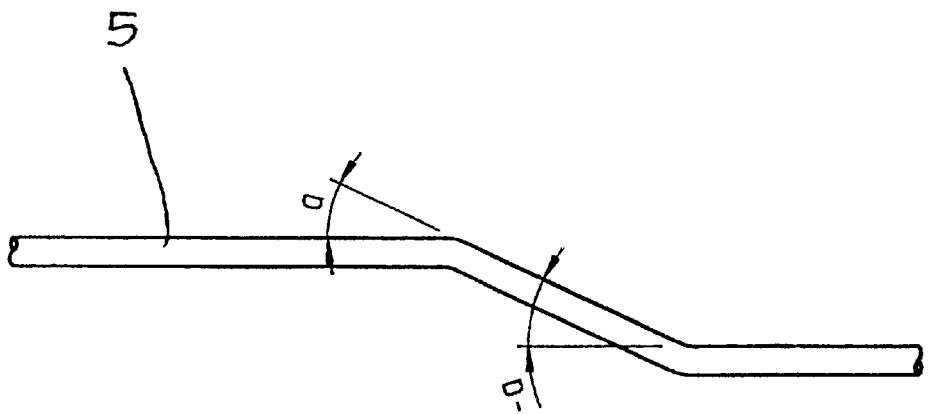

FIG. 6a shows a first exemplary arrangement of a flexible electric line 5 with a single change in direction 2α of at least 40°. FIG. 6b shows a second arrangement of a flexible electric line 5 with two changes in direction α that total more than 40° together. FIG. 6c shows still another arrangement of a flexible electric line 5 with two changes in direction α whose totals add up to more than 40° together. Is should be understood, however, that any arbitrary changes in direction are conceivable whose totals add up to more than 40°.

In order to be able to economically mount the electromotor in accordance with the invention, two mounting sequences are recommended. These mounting sequences are described with reference to FIGS. 7a, 7b, 8a, and 8b which are schematic drawings showing construction steps for assembling a motor in accordance with a first (FIGS. 7a and 7b) mounting sequence and a second (FIGS. 8a and 8b) mounting sequence. In the drawings, arrows and step designations are presented to show how a motor is assembled.

Figure 7A:
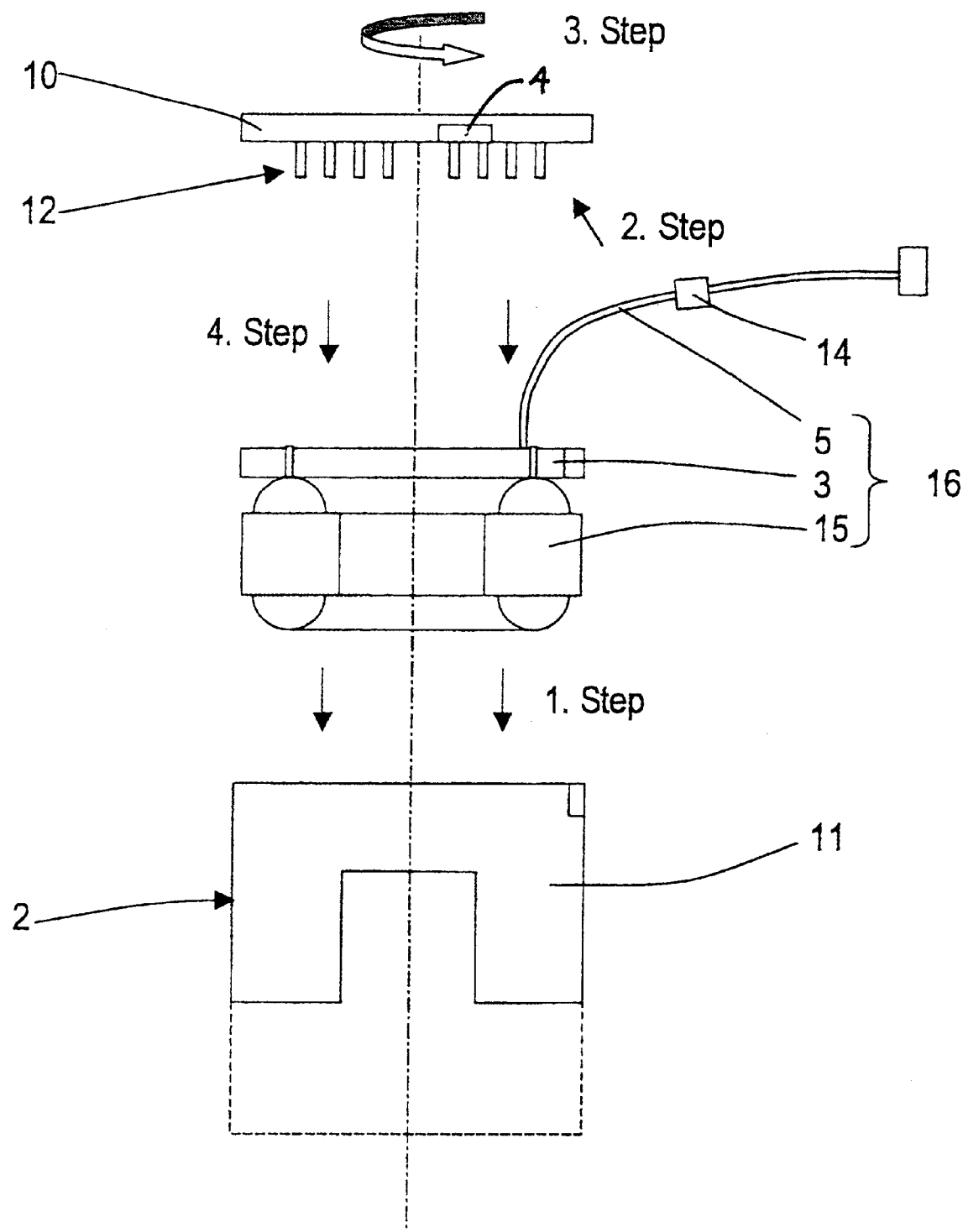
FIGS. 7a and 7b are schematic plan views showing the steps for assembling a motor in accordance with a first embodiment of the present invention.
Figure 7B:
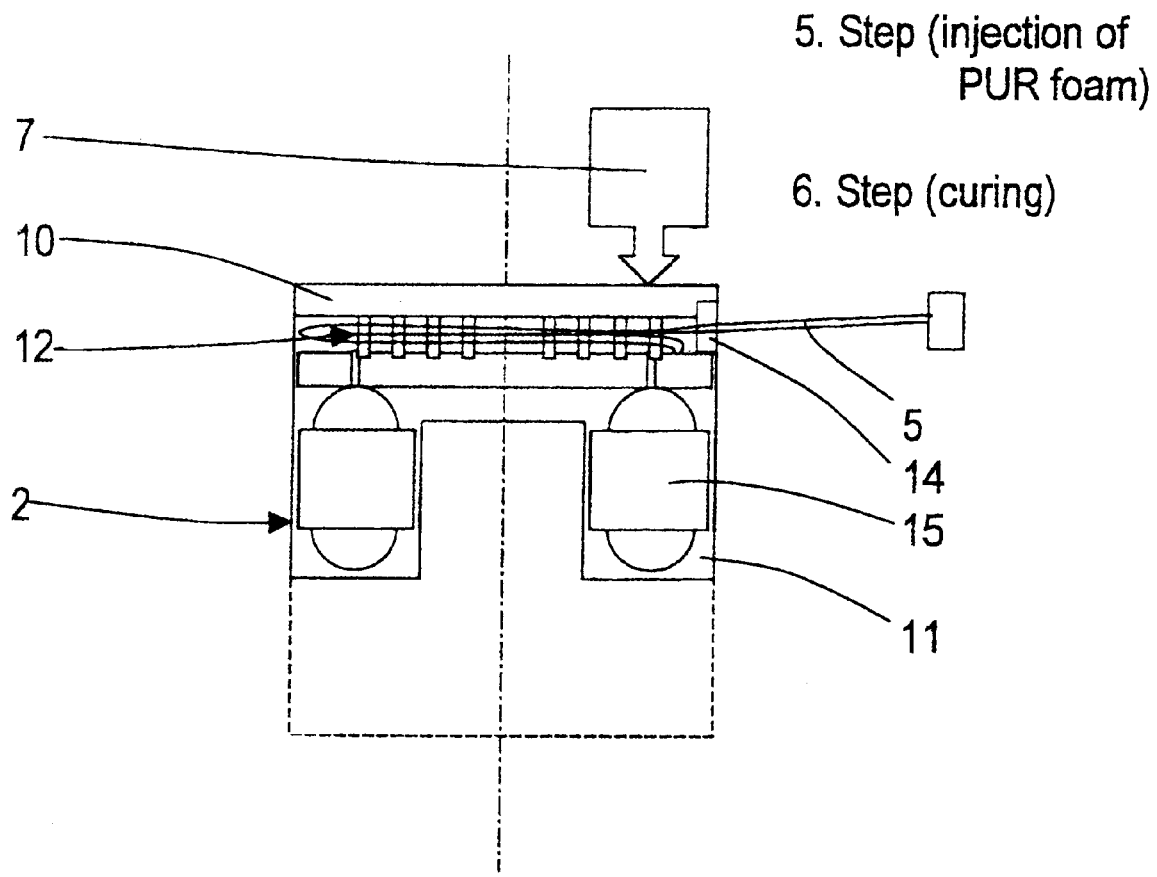
Figure 8A:
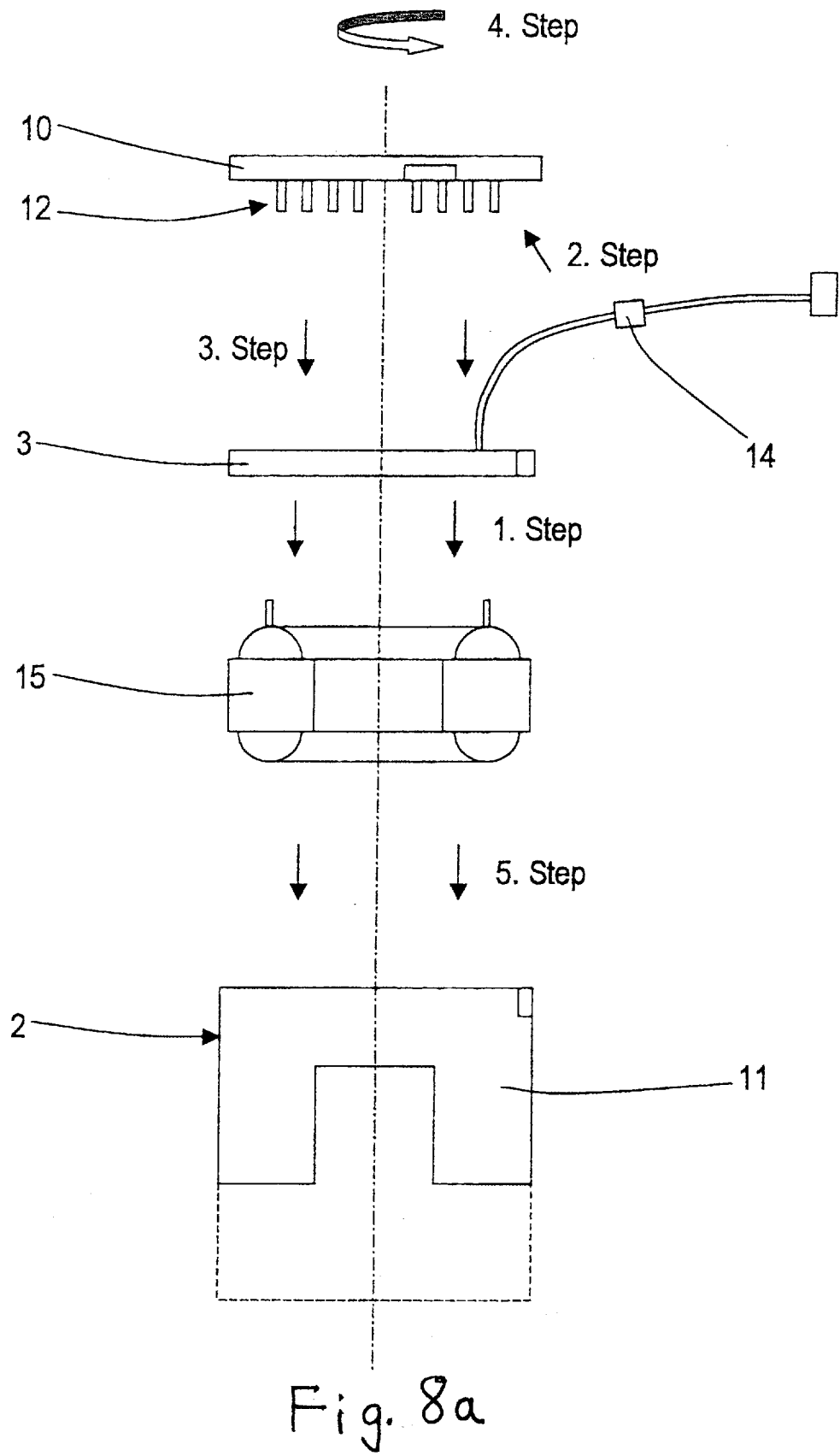
FIGS. 8a and 8b are schematic plan views showing the steps for assembling a motor in accordance with a second embodiment of the present invention.
Figure 8B:
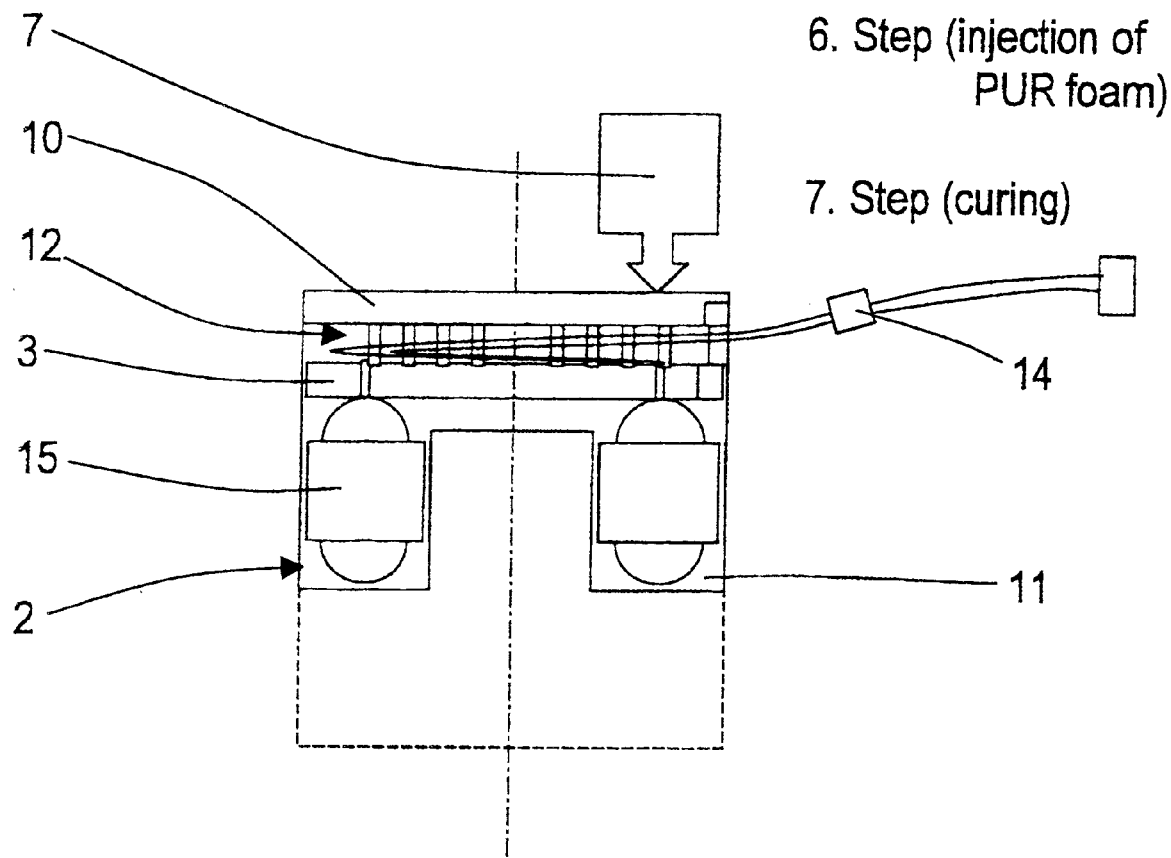

With reference to FIGS. 7a and 7b, in accordance with the first recommended sequence, in Step 1 a first construction unit 16 made up of a wound stator core 15 and a circuit board 3 provided with the electric lines 5 is first inserted into the motor pot 11. Then in Step 2, the flexible electric lines 5 are inserted into the guides 12 of the housing cover 10. By Step 3, the motor cover is positioned relative to the motor housing so that the opening 4 is aligned with the lines 5 and oriented to receive the bushing 14. After this in Step 4, the assembly is inserted into the motor housing 2. Then in Step 5, the motor housing is filled with the hardenable plastic material through at least one opening 13 in the motor housing, and finally, in Step 6, the plastic material is allowed to harden.

In accordance with the second recommended sequence, in Step 1, the wound stator core 15 is mounted in an assembled condition with the circuit board 3 and the connection lines 5 to form a second construction unit. Then, in Step 2, the flexible electric lines are inserted into the guides 12 of the housing cover 10. After this, in Step 3, the housing cover is joined with the second construction unit to define a third construction unit consisting of the housing cover 10, the circuit board 3 and the flexible electric lines 5, and the stator windings 15. In Step 4, the motor cover 4 is positioned relative to the motor housing 2 so that the opening 4 is aligned with the lines 5 and oriented to receive the bushing 14. After this in Step 5, the oriented third construction unit is inserted into the motor housing 2. Then in Step 6, the motor housing is filled with the hardenable plastic material through at least one opening 13 in the motor housing, and finally, in Step 7, the plastic material is allowed to harden.

The present invention may be embodied in other specific forms without departing from the intent or essential characteristics. The described embodiments are to be considered in all respects only as illustrative and not restrictive.

What is claimed is:

1. An electromotor comprising:

a motor housing having a passage;

a circuit board having connections and being mounted in the motor housing;

a hollow space defined within the motor housing and the circuit board;

a flexible electrical line mounted in the motor housing, the flexible electrical line being guided through the motor housing in the passage and electrically connected to the circuit board by way of the connections; and a hardenable plastic material filling said hollow space with the flexible electrical lines running between the connections to the circuit board and the passage of the motor housing with a total change in direction amounting to at least 40° and being arranged in at least one of the hollow spaces of the motor housing that is filled with hardenable plastic material and with the flexible electrical lines being essentially completely surrounded by the hardenable plastic material at least in the regions of the changes in direction in the progression of the electric lines characterized in that a fixing of the flexible electric lines is guaranteed in all spatial directions solely by the hardenable plastic material, whereby the connections do not need to absorb or transfer any mechanical forces, in particular tensile forces.

2. The electromotor in accordance with claim 1, wherein the hardenable plastic material has a foam-like composition.

3. The electromotor in accordance with claim 1, wherein the motor housing comprises a housing cover and a one-piece or assembled housing pot.

4. The electromotor in accordance with claim 3, wherein the guides are formed in one piece with the housing cover and serve as mounting aids for the progression of the flexible electric line.

5. The electromotor in accordance with claim 4, wherein the guides comprise protruding risers or pins.

6. The electromotor in accordance with claim 4, wherein the guides do not completely surround the flexible electric line.

7. The electromotor in accordance with claim 4, wherein the guides extend to the circuit board in their mounted state.

8. The electromotor in accordance with claim 4, wherein the guides in the housing cover are structured in such a way that, in their mounted state, they comprise a form fit with the hardenable plastic material in the axial direction.

9. The electromotor in accordance with claim 1, wherein at least one opening is present in the motor housing for filling a hollow space with hardenable plastic material.

10. The electromotor in accordance with claim 9, wherein two openings are present in the housing cover.

11. The electromotor in accordance with claim 1, wherein a bush is arranged between the flexible electric line and the passage through the motor housing, with this bush tightly surrounding the flexible electric line and the motor housing in such a way that the hardenable plastic mass cannot escape in its liquid state.

12. The electromotor in accordance with claim 1, wherein the housing cover with the bush tightly seals the housing pot in such a way that the hardenable plastic mass cannot escape in its liquid state.

13. The electromotor in accordance claim 1, wherein there are a plurality of flexible electric lines in the motor housing and these lines run in the form of a loop.

14. The electromotor in accordance with claim 1, wherein the hardenable plastic material approximately completely fills the hollow space between the housing cover and the circuit board.

15. The electromotor in accordance with claim 1, wherein the hardenable plastic material and the housing pot enter a form-fitting and/or frictional and/or material connection with one another.

* * * * *